United States Patent
Sugimoto et al.

(10) Patent No.: US 12,205,335 B2
(45) Date of Patent: Jan. 21, 2025

(54) IMAGING APPARATUS AND IMAGING METHOD

(71) Applicant: KOITO MANUFACTURING CO., LTD., Tokyo (JP)

(72) Inventors: Shintaro Sugimoto, Shizuoka (JP); Teruaki Torii, Shizuoka (JP); Yuta Haruse, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 141 days.

(21) Appl. No.: 18/175,669

(22) Filed: Feb. 28, 2023

(65) Prior Publication Data

US 2023/0206579 A1   Jun. 29, 2023

Related U.S. Application Data

(63) Continuation of application No. PCT/JP2021/030396, filed on Aug. 19, 2021.

(30) Foreign Application Priority Data

Aug. 28, 2020   (JP) ................. 2020-144807

(51) Int. Cl.
  *G06V 10/60*  (2022.01)
  *G06T 5/50*  (2006.01)
  (Continued)

(52) U.S. Cl.
  CPC .............. *G06V 10/141* (2022.01); *G06T 5/50* (2013.01); *G06V 10/60* (2022.01); *G06V 10/761* (2022.01); *G06T 2207/20221* (2013.01)

(58) Field of Classification Search
  CPC .... G06V 10/141; G06V 10/60; G06V 10/761; G06V 20/58; G06V 10/145; G06T 5/50;
  (Continued)

(56) References Cited

U.S. PATENT DOCUMENTS 9,819,872 B2 * 11/2017 Yoshikawa ............ H04N 23/73
10,536,651 B2 * 1/2020 Wada ..................... H04N 25/48
(Continued)

FOREIGN PATENT DOCUMENTS

JP   H02100589 A   4/1990
JP   2009180662 A   8/2009
(Continued)

OTHER PUBLICATIONS

Ferri, F., et al., "Differential Ghost Imaging", Physical Review Letters, Jun. 25, 2010, vol. 104, Issue 25, pp. 253603-1-253603-4, The American Physical Society. (5 pages).

(Continued)

*Primary Examiner* — Mekonnen D Dagnew
(74) *Attorney, Agent, or Firm* — BUCHANAN, INGERSOLL & ROONEY PC

(57) ABSTRACT

An illumination apparatus emits illumination light S1 with an intensity distribution that changes with time. A photodetector measures reflected light from an object. A reconstruction processing unit reconstructs an intermediate image $H_i(x, y)$ of the object for every predetermined number of changes of the intensity distribution using a correlation calculation between detection intensities based on the output of the photodetector and the intensity distributions of the illumination light. A combining processing unit calculates shift amounts $\Delta x$ and $\Delta y$ for matching between the current reconstructed image $G_i(x, y)$ obtained by combining the previous intermediate images $H(x, y)$ and the current intermediate image $H_i(x, y)$. Subsequently, the current reconstructed image $G_i(x, y)$ is shifted based on the shift amounts $\Delta x$ and $\Delta y$. The shifted reconstructed image $G_i(x-\Delta x, y-\Delta y)$ is combined with the latest intermediate image $H_i(x, y)$ to create a new reconstructed image $G_{i+1}(x, y)$.

5 Claims, 7 Drawing Sheets

(51) Int. Cl.
*G06V 10/141* (2022.01)
*G06V 10/74* (2022.01)

(58) Field of Classification Search
CPC .......... G06T 2207/20221; H04N 23/74; H04N 23/95; H04N 23/951; G01S 17/89; G01S 17/931
See application file for complete search history.

(56) References Cited

U.S. PATENT DOCUMENTS

| | | |
|---|---|---|
| 2013/0077891 A1 | 3/2013 | Nimnual et al. |
| 2015/0249814 A1 | 9/2015 | Nanri et al. |
| 2020/0284883 A1* | 9/2020 | Ferreira ................ H04N 25/773 |
| 2024/0103175 A1* | 3/2024 | Valdmann ............. G01S 7/4816 |

FOREIGN PATENT DOCUMENTS

| | | |
|---|---|---|
| JP | 6412673 B1 | 10/2018 |
| WO | 2014049919 A1 | 4/2014 |

OTHER PUBLICATIONS

International Preliminary Report on Patentability Chapter I (PCT/IB/373) mailed on Feb. 28, 2023 and Written Opinion (PCT/ISA/237) with translation mailed on Oct. 26, 2021 by The International Bureau of WIPO in corresponding International Patent Application No. PCT/JP2021/030396. (7 pages).

International Search Report (PCT/ISA/210) with translation mailed on Oct. 26, 2021 by the Japanese Patent Office as the International Searching Authority for International Application No. PCT/JP2021/030396. (4 pages).

* cited by examiner

FIG. 5A

| AMOUNT OF SHIFT (x,y) | (0,0) | (5,5) | (10,10) | (15,15) | (20,20) | (25,25) |
|---|---|---|---|---|---|---|
| INTERMEDIATE IMAGE H(x,y) | | | | | | |

| | (30,30) | (35,35) | (40,40) | (45,45) | (50,50) | (55,55) |
|---|---|---|---|---|---|---|
| | | | | | | |

FIG. 5B

| AMOUNT OF SHIFT (x,y) | (0,0) ORIGINAL IMAGE | (5,5) | (10,10) | (15,15) | (20,20) | (25,25) |
|---|---|---|---|---|---|---|
| COMBINED RECONSTRUCTED IMAGE G(x,y) | | | | | | |

| | (30,30) | (35,35) | (40,40) | (45,45) | (50,50) | (55,55) |
|---|---|---|---|---|---|---|
| | | | | | | |

IMAGING APPARATUS AND IMAGING METHOD

BACKGROUND

1. Technical Field

The present disclosure relates to an imaging apparatus.

2. Description of the Related Art

In order to support autonomous driving or autonomous control of the light distribution of a headlamp, an object identification system is employed for sensing the position and the kind of an object that exists in the vicinity of a vehicle. The object identification system includes a sensor and a processing device configured to analyze the output of the sensor. As such a sensor, a desired one is selected from among a camera, LiDAR (Light Detection and Ranging, Laser Imaging Detection and Ranging), millimeter-wave radar, ultrasonic sonar, etc., giving consideration to the usage, required precision, and cost.

As one from among imaging apparatuses (sensors), an imaging apparatus using the principle of ghost imaging (which will be referred to as a "quantum radar camera" hereafter) is known. In ghost imaging, an object is irradiated with illumination light while randomly switching the intensity distribution (pattern) of the illumination light, and the light intensity of the reflected light is measured for each pattern. The detected light intensity is detected as the energy over a given plane or the integrated value of the intensity. That is to say, the detected light intensity is not detected as an intensity distribution. With this, by calculating the correlation between each pattern and the corresponding detected light intensity, a reconstructed image of the object is obtained (reconstructed).

In ghost imaging, the correlation is calculated while switching the intensity distribution of the illumination light several thousand to several tens of thousands of times (=total number of irradiations), so as to acquire a final reconstructed image. In automotive usage, the sensing object (subject) moves relative to the camera. Accordingly, the subject moves during the several thousand to several tens of thousands of irradiations, leading to the occurrence of subject blurring.

In order to prevent the occurrence of subject blurring, it is necessary to reduce the total number of irradiations. However, this leads to degraded image quality.

SUMMARY

The present disclosure has been made in view of such a situation. It is an exemplary purpose of an embodiment of the present disclosure to provide an imaging apparatus that is capable of sensing a moving object.

An imaging apparatus according to an embodiment of the present disclosure includes: an illumination apparatus structured to irradiate an object with illumination light with an intensity distribution that changes with time; a photodetector structured to measure reflected light from the object; a reconstruction processing unit structured to reconstruct an intermediate image of the object for every predetermined number of times the intensity distribution changes, using a correlation calculation between detection intensities based on the output of the photodetector and intensity distributions of the illumination light; and a combining processing unit structured to sequentially combine the intermediate images so as to update a reconstructed image. The combining processing unit calculates an amount of shift that matches the latest reconstructed image to the current intermediate image using a phase-only correlation method. Furthermore, the combining processing unit shifts the latest reconstructed image by the amount of shift and combines the shifted latest reconstructed image with the current intermediate image so as to generate a new reconstructed image.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 5A is a diagram showing an intermediate image H(x, y), and FIG. 5B is a diagram showing a reconstructed image G(x, y);

DETAILED DESCRIPTION

Outline of Embodiments

Figure 1:
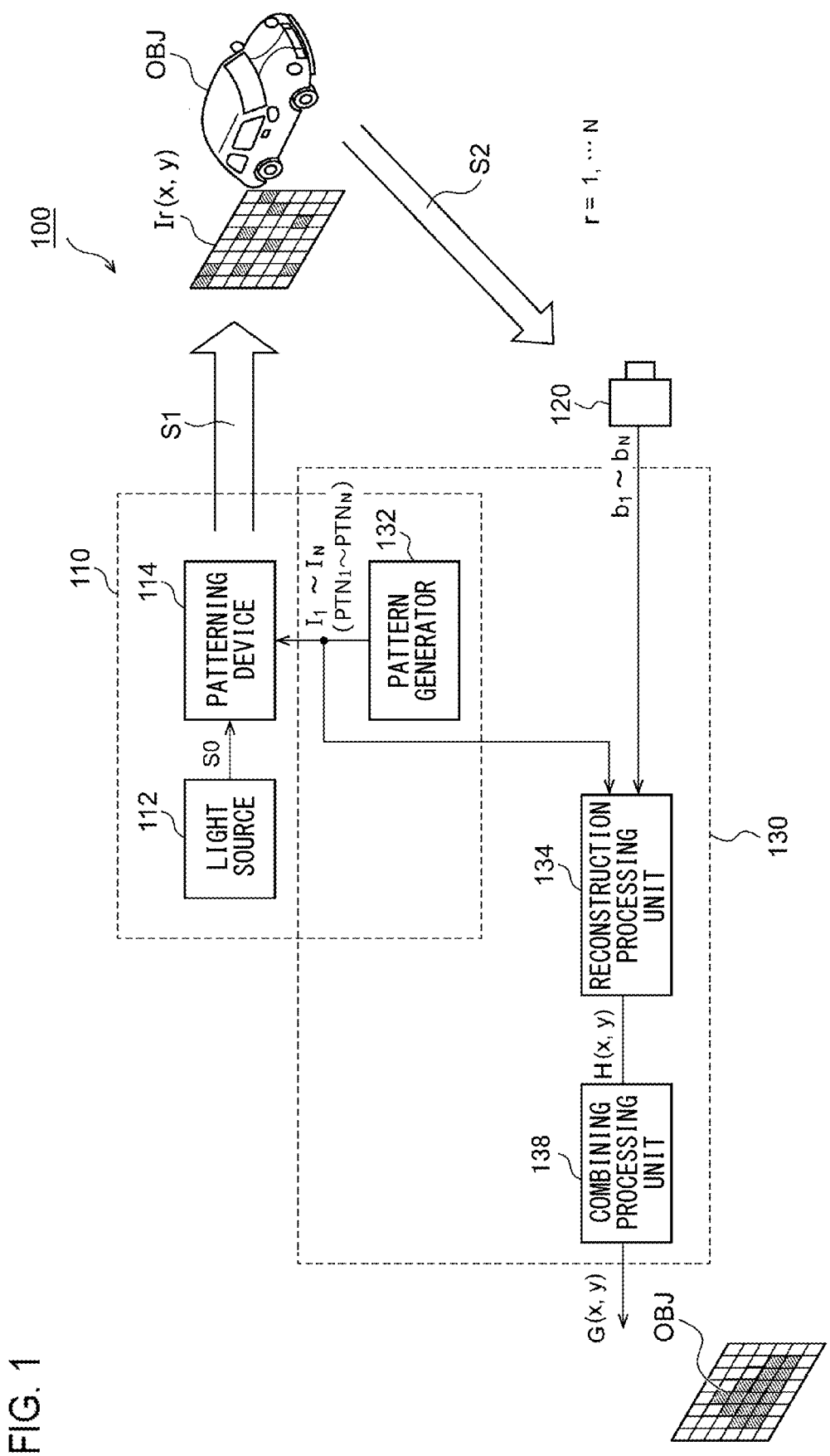
FIG. 1 is a diagram showing an imaging apparatus according to an embodiment.

Description will be made regarding the outline of several exemplary embodiments of the present disclosure. The outline is a simplified explanation regarding several concepts of one or multiple embodiments as a prelude to the detailed description described later in order to provide a basic understanding of the embodiments. That is to say, the outline described below is by no means intended to restrict the scope of the present invention and the present disclosure. Furthermore, the outline described below is by no means a comprehensive outline of all the possible embodiments. That is to say, the outline described below by no means restricts essential components of the embodiments. For convenience, in some cases, "an embodiment" as used in the present specification represents a single or multiple embodiments (examples and modifications) disclosed in the present specification.

An imaging apparatus according to an embodiment includes: an illumination apparatus structured to irradiate an object with illumination light with an intensity distribution that changes with time; a photodetector structured to measure reflected light from the object; a reconstruction processing unit structured to reconstruct an intermediate image of the object for every predetermined number of times the intensity distribution changes, using a correlation calculation between detection intensities based on the output of the photodetector and intensity distributions of the illumination light; and a combining processing unit structured to sequentially combine the intermediate images so as to update a reconstructed image. The combining processing unit calculates an amount of shift that matches the latest reconstructed image to the current intermediate image using a phase-only correlation method. Furthermore, the combining processing unit shifts the latest reconstructed image by the amount of shift, and combines the shifted latest reconstructed image with the current intermediate image so as to generate a new reconstructed image.

With this configuration, the intermediate image reconstruction processing is repeated using a small number of irradiations, and the latest reconstructed image is shifted and combined with a new intermediate image so as to generate a new reconstructed image. This provides high image quality while suppressing the effect of subject blurring. In addition, by using the phase-only correlation method, this is capable of detecting an amount of shift of a moving object with high speed, thereby enabling high-precision combining processing.

In one embodiment, the combining processing unit may skip the combining processing according to a comparison result between a correlation value obtained in the phase-only correlation method and a predetermined value. If the correlation value is small, there is a possibility that correct matching has not been obtained and a precise amount of shift has not been obtained. In this case, the combining processing is not executed. Conversely, the combining processing is executed only in a case in which a high correlation value and highly reliable amount of shift have been obtained. This provides high image quality.

Embodiments

Description will be made below regarding preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

The "random light intensity distribution" in the present specification does not mean that the light intensity distribution is completely random. Rather, the light intensity distribution may be random to an extent that allows an image to be reconstructed by ghost imaging. Accordingly, "random" in the present specification may include a certain degree of regularity. Also, "random" does not require the light intensity distribution to be completely unpredictable. That is to say, the light intensity distribution may also be predictable and reproducible.

FIG. 1 is a diagram showing an imaging apparatus 100 according to an embodiment. The imaging apparatus 100 is configured as a correlation function image sensor using the principle of ghost imaging. The imaging apparatus 100 includes an illumination apparatus 110, a photodetector 120, and a processing device 130. The imaging apparatus 100 will also be referred to as a "quantum radar camera".

The illumination apparatus 110 is configured as a pseudo-thermal light source. The illumination apparatus 110 generates illumination light S1 patterned such that it has a spatial intensity distribution I(x, y) that can be regarded as substantially random, and radiates the illumination light S1 to an object OBJ (field of view). The illumination light S1 is sequentially irradiated while changing the light intensity distribution at random.

The illumination apparatus 110 includes a light source 112, a patterning device 114, and a pattern generator 132.

The light source 112 generates light S0 having a uniform light intensity distribution. As the light source 112, a laser, a light-emitting diode, or the like, may be employed. The wavelength and the spectrum of the illumination light S1 are not restricted in particular. As the illumination light S1, white light having multiple wavelengths or a continuous spectrum may be employed. Also, monochromatic light having a predetermined wavelength may be employed. The illumination light S1 may also have a wavelength in the infrared region or ultraviolet region.

The patterning device 114 has multiple pixels arranged in a matrix. The patterning device 114 is configured to be capable of spatially modulating the light intensity distribution I based on the combination of the on/off states of the multiple pixels. In the present specification, a pixel set to the on state will be referred to as an "on pixel". On the other hand, a pixel set to the off state will be referred to as an "off pixel". It should be noted that, in the following description, for ease of understanding, description will be made assuming that each pixel is settable to only two values, i.e., 1 and 0. However, the present invention is not restricted to such an arrangement. Also, each pixel may be settable to an intermediate value.

As the patterning device 114, a reflective Digital Micromirror Device (DMD) or a transmissive liquid crystal device may be employed. The patterning device 114 receives the supply of a pattern signal PTN (image data) generated by the pattern generator 132.

The pattern generator 132 generates a pattern signal PTNr that specifies the light intensity distribution $I_r$ of the illumination light S1. The pattern generator 132 switches the pattern signal PTNr (r=1, 2, . . . ) with time.

The photodetector 120 measures the reflected light from the object OBJ, and outputs a detection signal Dr. The detection signal Dr is a spatially integrated value of the light energy (or intensity) input to the photodetector 120 when the object OBJ is irradiated with the illumination light having the light intensity distribution $I_r$. Accordingly, as the photodetector 120, a single-pixel photodetector can be employed.

In ghost imaging in which an object that can be regarded as a stationary object is sensed, the total number of irradiations M required to reconstruct the object image is determined, and the object is irradiated with the illumination light S1 while switching the light intensity distribution for M patterns ($I_1$ through $I_M$). Furthermore, the photodetector 120 acquires multiple detection signals $D_1$ through $D_M$ that correspond to the light intensity distributions $I_1$ through $I_M$ of the respective M multiple patterns.

Description will be made assuming that the object OBJ is irradiated with the illumination light S1 having a given light intensity distribution $I_r$ for a given illumination period. Also, description will be made assuming that the detection signal Dr represents an amount of light received at a given time point (or for an infinitesimal time), i.e., an instantaneous value thereof. In this case, the detection signal Dr may be sampled multiple times in an illumination period. Also, as the detection intensity $b_r$, an integrated value, an average value, or the maximum value of the detection signal Dr of all the sampled values may be employed. Alternatively, from among all the sampled values, some may be selected and used to calculate such an integrated value, average value, or maximum value of the selected sampled values. For the selection of the multiple sampled values, x-th through y-th sampled values may be extracted in descending order from the maximum value, for example. Also, sampled values that are smaller than an arbitrary threshold value may be excluded. Also, sampled values with small signal fluctuation may be extracted.

In a case in which, as the photodetector 120, a device such as a camera that is capable of setting an exposure time is employed, the output Dr of the photodetector 120 may be directly used as the detection intensity $b_r$.

The conversion from the detection signal Dr to the detection intensity $b_r$ may be executed by the processing device 130 or an external component of the processing device 130.

With this, a reconstructed image G(x, y) is reconstructed based on a correlation function represented by Expression (1). Here, $I_r$ represents intensity distribution of the r-th (r=1, 2, ..., M) illumination light, and $b_r$ represents the detection intensity value acquired when the object is irradiated with the illumination light having the r-th intensity distribution. It should be noted that the detection intensities $b_1$ through $b_M$ are calculated based on the detection signals $D_1$ through $D_M$. The relation between the detection intensity and the detection signal may preferably be determined giving consideration to the kind of the photodetector 120 and the method employed in the photodetector 120. The processing based on Expression (1) will be referred to as "batch reconstruction processing".

$$G(x, y) = \frac{1}{M}\sum_{r=1}^{M}[\{b_r - \langle b \rangle\} \cdot I_r(x, y)] \quad (1)$$

$$\langle b \rangle = \frac{1}{M}\sum_{r=1}^{M} b_r$$

Figure 2:
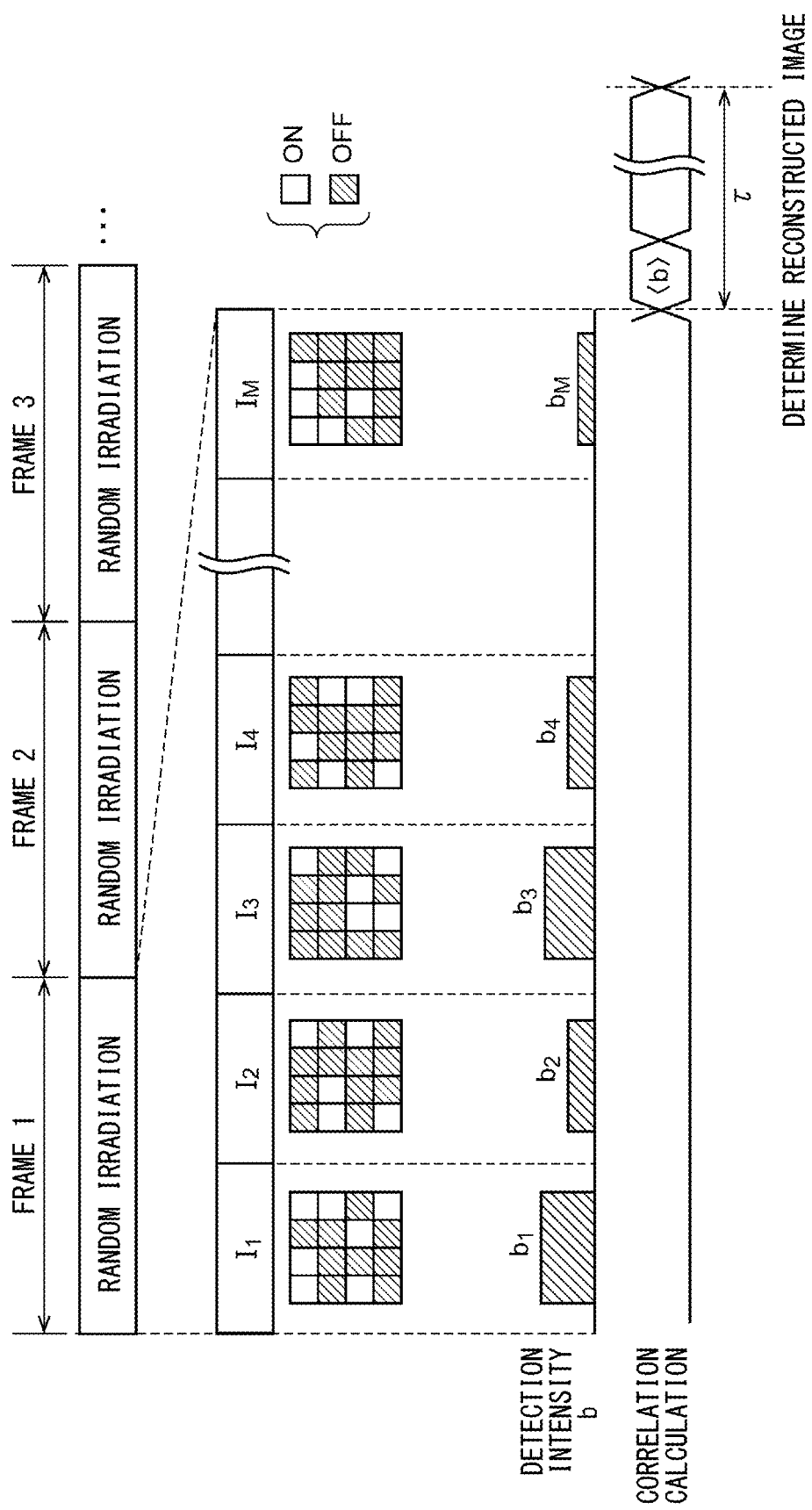
FIG. 2 is a time chart showing the sensing of individual frames in batch reconstruction processing.

FIG. 2 is a time chart showing the sensing of individual frames of the batch reconstruction processing. As can be understood based on Expression (1), the correlation calculation requires an average value <b> of the M detection intensities $b_1$ through $b_M$ acquired for M irradiations of the illumination light.

In the batch reconstruction processing, after the calculation of the average value <b> after the M irradiations, the correlation calculation is started. Typically, M is a very large number, and specifically, is several thousand to several tens of thousands. The operating frequency of the patterning device 114 is limited. Accordingly, such a large total number of irradiations M requires a relatively long period of time. This involves the occurrence of subject blurring when an image of a moving object is captured. In order to solve such a problem, the imaging apparatus 100 according to the present embodiment executes division shift reconstruction processing described below instead of the batch reconstruction processing.

Returning to FIG. 1, the processing device 130 includes a pattern generator 132, a reconstruction processing unit 134, and a combining processing unit 138. The processing device 130 may be configured as a combination of a processor (hardware) such as a Central Processing Unit (CPU), Micro Processing Unit (MPU), microcontroller, or the like, and a software program to be executed by the processor (hardware). The processing device 130 may be a combination of multiple processors. Alternatively, the processing device 130 may be configured of hardware components alone.

The reconstruction processing unit 134 reconstructs an intermediate image H(x, y) of an object using division shift reconstruction processing. In the division shift reconstruction processing, the intermediate image H(x, y) of the object is reconstructed for every predetermined number n (n<<M) irradiations of the illumination light S1 using the correlation calculation between the detection intensities $b_1$ through $b_n$ based on the output of the photodetector 120 and the intensity distribution $I_1(x, y)$ of the illumination light S1. The intermediate image H(x, y) is represented by Expression (2).

$$H(x, y) = \frac{1}{N}\sum_{r=1}^{N}[\{b_r - \langle b \rangle\} \cdot I_r(x, y)] \quad (2)$$

$$\langle b \rangle = \frac{1}{N}\sum_{r=1}^{N} b_r$$

The combining processing unit 138 sequentially combines the intermediate images H(x, y) so as to update the reconstructed image G(x, y).

Figure 3:
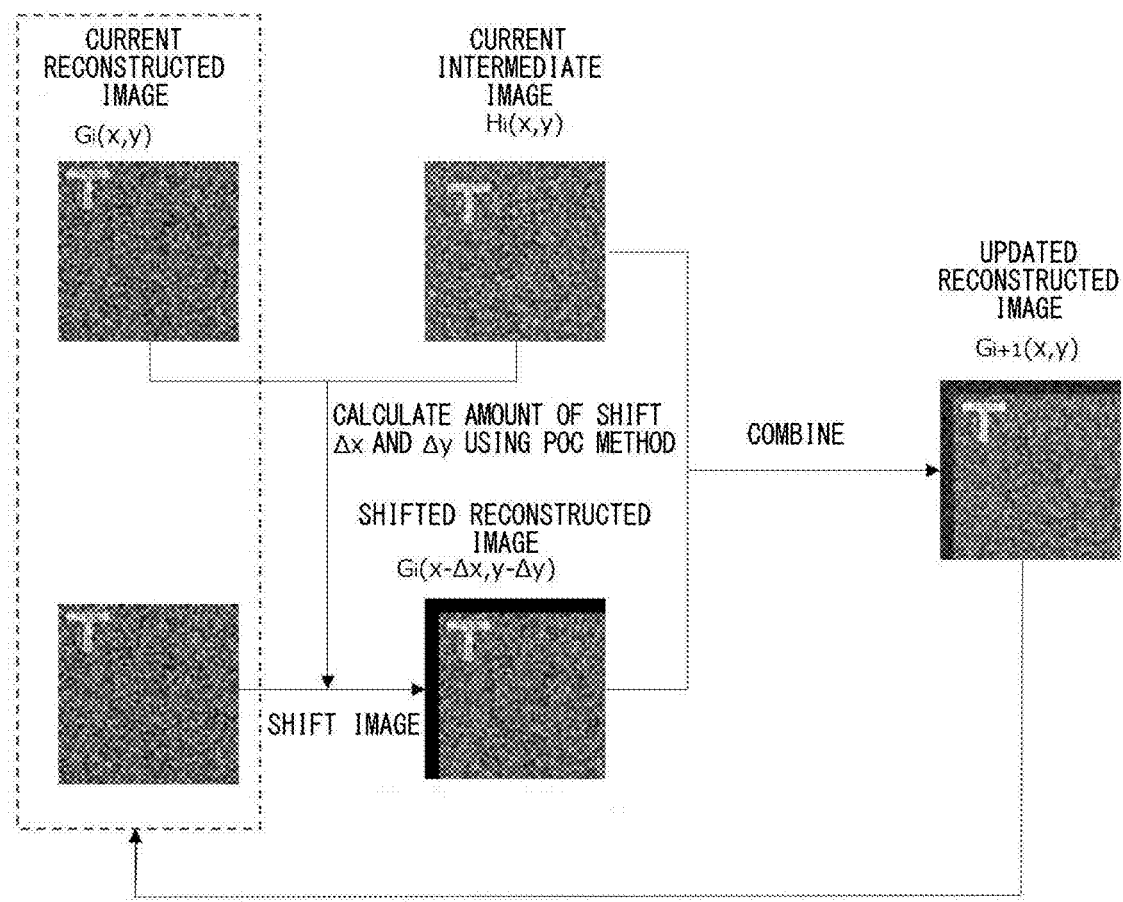
FIG. 3 is a flowchart for explaining division shift reconstruction processing in a processing device.

FIG. 3 is a flowchart for explaining the division shift reconstruction processing in the processing device 130. Here, "i" represents the current cycle. Specifically, the current intermediate image will be represented by $H_i(x, y)$. The current (latest) reconstructed image, which is obtained by combining the previous intermediate images $H_1(x, y)$ through $H_{i-1}(x, y)$ obtained before the acquisition of the intermediate image $H_i(x, y)$, will be represented by $G_i(x, y)$.

The combining processing unit 138 calculates the amount of shift ($\Delta x$, $\Delta y$) to be used for matching of the current reconstructed image $G_i(x, y)$ and the current intermediate image $H_i(x, y)$ using the phase-only correlation (POC) method.

Subsequently, the current reconstructed image $G_i(x, y)$ is shifted based on the amount of shift ($\Delta x$, $\Delta y$), the reconstructed image $G_i(x-\Delta x, y-\Delta y)$ thus shifted is combined with the current intermediate image $H_i(x, y)$, and the combined image is employed as a new reconstructed image $G_{i+1}(x, y)$. The combination may be executed by weighted addition.

$$G_{i+1}(x, y) = A \times G_i(x-\Delta x, y-\Delta y) + B \times H_i(x, y) \quad (3)$$

Here, A and B each represent a weighting coefficient.

The final reconstructed image $G_{K+1}(x, y)$ obtained by combining the K intermediate images $H_1(x, y)$ through $H_K(x, y)$ can be calculated as represented by Expression (4).

$$G_{i+1}(x, y) = 1/K \cdot \Sigma_{i=1:K} H_i(x-\Delta x_i, y-\Delta y_i) \quad (4)$$

Here, $\Delta x_i$ and $\Delta y_i$ each represent an amount of shift required to superimpose the i-th intermediate image $H_i(x, y)$ on the K-th intermediate image $H_K(x, y)$.

Figure 4:
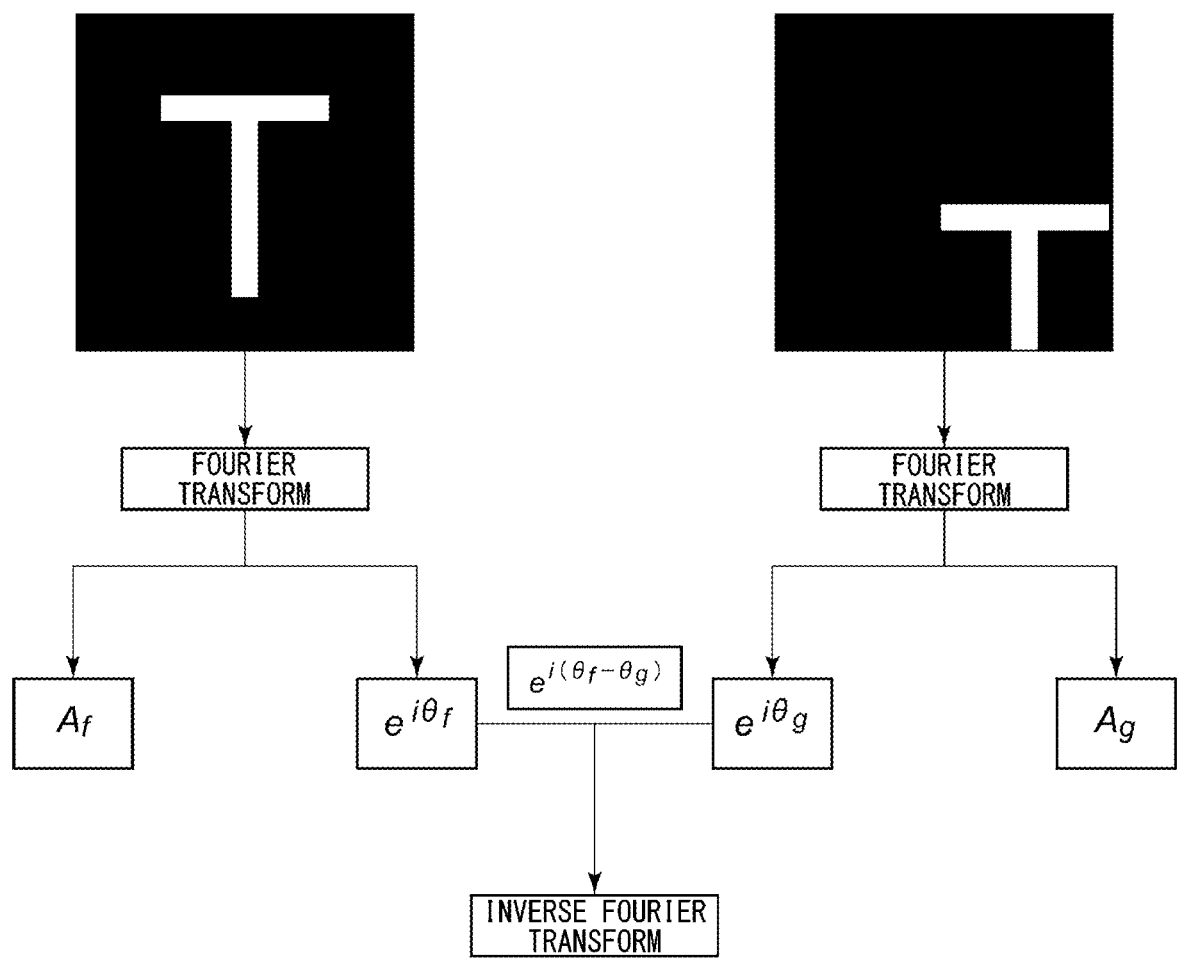
FIG. 4 is a schematic diagram showing a phase only correlation method.

FIG. 4 is a schematic diagram showing the phase-only correlation method. In a case in which two images F and G are to be used, the two images F and G are each subjected to a Fourier transform so as to obtain amplitude information $A_F$ and phase information $\theta_F$ of the image F and amplitude information $A_G$ and phase information $\theta_G$ of the image G. In the phase-only correlation method, attention is directed to the phase information $\theta_F$ and $\theta_G$. Specifically, the difference between the phase information $\theta_F$ and $\theta_G$ is subjected to an inverse Fourier transform so as to obtain the amount of shift between the two images F and G.

The above is the configuration of the imaging apparatus 100. Next, description will be made regarding the operation thereof with reference to the simulation results.

In the simulation, the letter "T" was employed as the target. The letter "T" was shifted by five pixels in the horizontal direction and by five pixels in the vertical direction for each cycle. The number of irradiations n for each cycle (for the generation of one intermediate image $H_i(x, y)$) was set to 600.

FIG. 5A is a diagram showing the intermediate images $H_1(x, y)$ through $H_{12}(x, y)$. FIG. 5B is a diagram showing the reconstructed image G(x, y) in each cycle.

As shown in FIG. 5A, the individual intermediate images $H_1(x, y)$ through $H_{12}(x, y)$ each have low contrast. In contrast, by repeatedly shifting and combining the intermediate images, this is capable of providing high-contrast images as shown in FIG. 5B. That is to say, it can be understood that such an arrangement provides improved image quality.

It should be noted that, with the phase-only correlation method, this is capable of acquiring a correlation value between two images in addition to the amount of shift. The combining processing unit 138 may skip the combining processing according to the comparison result between the correlation value obtained using the phase-only correlation method and a predetermined value. If the correlation value is small, there is a possibility that correct matching has not been obtained and a precise amount of shift has not been obtained. In this case, the combining processing may not be executed. Conversely, the combining processing may be executed only in a case in which a high correlation value and highly reliable amount of shift have been obtained. This provides high image quality.

The above-described embodiments have been described for exemplary purposes only. Rather, it can be readily conceived by those skilled in this art that various modifications may be made by making various combinations of the aforementioned components or processes, which are also encompassed in the technical scope of the present invention. Description will be made below regarding such modifications.

Description has been made in the embodiment regarding an arrangement in which the illumination apparatus 110 is configured as a combination of the light source 112 and the patterning device 114. However, the present invention is not restricted to such an arrangement. For example, the illumination apparatus 110 may be configured as an array of multiple semiconductor light sources (light-emitting diodes (LEDs) or laser diodes (LDs)) arranged in a matrix, and may be configured to be capable of controlling the on/off state (or luminance) of each semiconductor light source.

Usage

Figure 6:
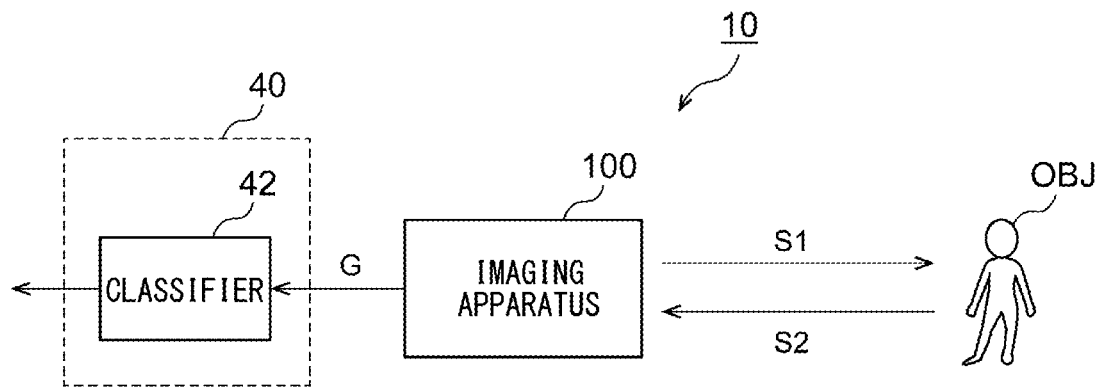
FIG. 6 is a block diagram of an object identification system.

Next, description will be made regarding the usage of the imaging apparatus 100. FIG. 6 is a block diagram showing an object identification system 10. The object identification system 10 is mounted on a vehicle such as an automobile, motorcycle, or the like. The object identification system 10 judges the kind (category) of an object OBJ that exists in the vicinity of the vehicle.

The object identification system 10 includes the imaging apparatus 100 and a processing device 40. As described above, the imaging apparatus 100 irradiates the object OBJ with the illumination light S1, and measures the reflected light S2, so as to generate a reconstructed image G of the object OBJ.

The processing device 40 processes the output image G output from the imaging apparatus 100, and judges the position and the kind (category) of the object OBJ.

A classifier 42 included in the processing device 40 receives the image G as its input, and judges the position and the kind of the object OBJ included in the image G. The classifier 42 is implemented based on a model generated by machine learning. The algorithm employed by the classifier 42 is not restricted in particular. Examples of algorithms that can be employed include You Only Look Once (YOLO), Single Shot MultiBox Detector (SSD), Region-based Convolutional Neural Network (R-CNN), Spatial Pyramid Pooling (SPPnet), Faster R-CNN, Deconvolution-SSD (DSSD), Mask R-CNN, etc. Also, other algorithms that will be developed in the future may be employed.

The above is the configuration of the object identification system 10. With such an arrangement employing the imaging apparatus 100 as a sensor of the object identification system 10, this provides the following advantages.

With such an arrangement employing the imaging apparatus 100, i.e., a quantum radar camera, this provides dramatically improved noise resistance. For example, when the vehicle travels in rain, snow, or fog, it is difficult to recognize the object OBJ with the naked eye. In contrast, with such an arrangement employing the imaging apparatus 100, this allows a reconstructed image G of the object OBJ to be acquired without the effects of rain, snow, or fog.

Figure 7:
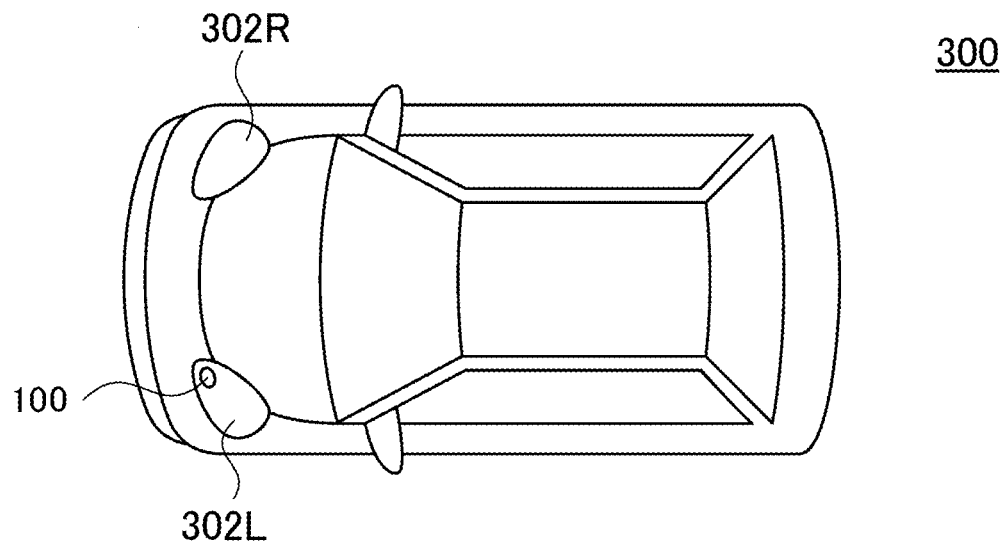
FIG. 7 is a block diagram of an automobile provided with an object identification system.

FIG. 7 is a block diagram showing an automobile provided with the object identification system 10. An automobile 300 is provided with headlamps 302L and 302R. The imaging apparatus 100 is built into at least one from among the headlamps 302L and 302R. Each headlamp 302 is positioned at a frontmost end of the vehicle body, which is most advantageous as a position where the imaging apparatus 100 is to be installed for detecting an object in the vicinity.

Figure 8:
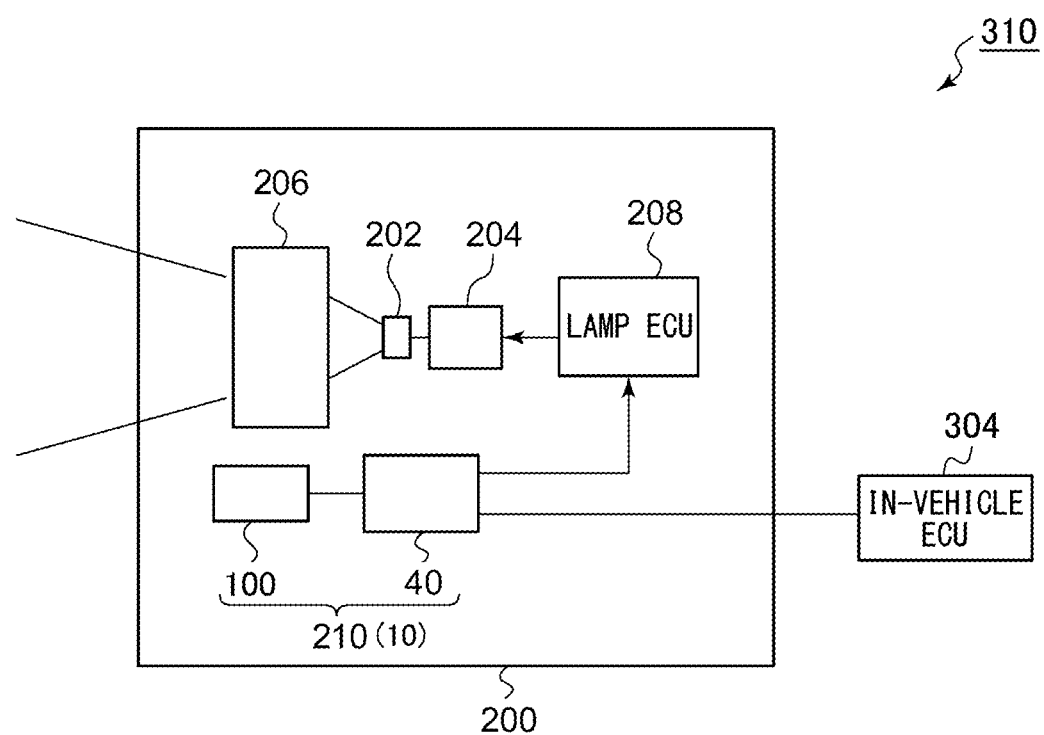
FIG. 8 is a block diagram showing an automotive lamp provided with an object detection system.

FIG. 8 is a block diagram showing an automotive lamp 200 provided with an object detection system 210. The automotive lamp 200 forms a lamp system 310 together with an in-vehicle ECU 304. The automotive lamp 200 includes a light source 202, a lighting circuit 204, and an optical system 206. Furthermore, the automotive lamp 200 includes the object detection system 210. The object detection system 210 corresponds to the object identification system 10 described above. The object detection system 210 includes the imaging apparatus 100 and the processing device 40.

Also, the information with respect to the object OBJ detected by the processing device 40 may be used to support the light distribution control operation of the automotive lamp 200. Specifically, a lamp ECU 208 generates a suitable light distribution pattern based on the information with respect to the kind of the object OBJ and the position thereof generated by the processing device 40. The lighting circuit 204 and the optical system 206 operate so as to provide the light distribution pattern generated by the lamp ECU 208.

Also, the information with respect to the object OBJ detected by the processing device 40 may be transmitted to the in-vehicle ECU 304. The in-vehicle ECU may support autonomous driving based on the information thus transmitted.

Description has been made regarding the present invention with reference to the embodiments using specific terms. However, the above-described embodiments show only an aspect of the mechanisms and applications of the present invention. Rather, various modifications and various changes in the layout can be made without departing from the spirit and scope of the present invention defined in appended claims.

What is claimed is:

1. An imaging apparatus comprising:
   an illumination apparatus structured to irradiate an object with illumination light with an intensity distribution that changes with time;

a photodetector structured to measure reflected light from the object;

a reconstruction processing unit structured to reconstruct an intermediate image of the object for every predetermined number of changes of the intensity distribution, using a correlation calculation between detection intensities based on an output of the photodetector and the intensity distributions of the illumination light; and a combining processing unit structured to sequentially combine the intermediate images so as to update a reconstructed image, wherein the combining processing unit is structured to calculate an amount of shift that matches a latest reconstructed image to a current intermediate image using a phase-only correlation method, and wherein the combining processing unit is structured to shift the latest reconstructed image by the amount of shift and to combine the shifted latest reconstructed image to the current intermediate image so as to generate a new reconstructed image.

2. The imaging apparatus according to claim 1, wherein the combining processing unit is structured to skip the combining processing according to a comparison result between a correlation value obtained in the phase-only correlation method and a predetermined value.

3. An automotive lamp comprising the imaging apparatus according to claim 1.

4. A vehicle comprising the imaging apparatus according to claim 1.

5. An imaging method comprising:

irradiating an object with illumination light with an intensity distribution that changes with time;

measuring reflected light from the object by means of a photodetector;

reconstructing an intermediate image of the object for every predetermined number of times the intensity distribution changes, using a correlation calculation between detection intensities based on an output of the photodetector and intensity distributions of the illumination light; and sequentially combining the intermediate images so as to update a reconstructed image, wherein the generation of the reconstructed image comprises:

calculating an amount of shift that matches a latest reconstructed image to a current intermediate image using a phase-only correlation method;

shifting the latest reconstructed image by the amount of shift; and combining the shifted latest reconstructed image with the current intermediate image so as to generate a new reconstructed image.

* * * * *